United States Patent
Allais et al.

(10) Patent No.: US 10,884,131 B1
(45) Date of Patent: Jan. 5, 2021

(54) CONFLICT RESOLVER FOR A LIDAR DATA SEGMENTATION SYSTEM OF AN AUTONOMOUS VEHICLE

(71) Applicant: GM GLOBAL TECHNOLOGY OPERATIONS LLC, Detroit, MI (US)

(72) Inventors: Andrea Allais, San Francisco, CA (US); Micah Christopher Chambers, Oakland, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 16/054,053

(22) Filed: Aug. 3, 2018

(51) Int. Cl.
*G01S 17/931* (2020.01)
*G06T 7/11* (2017.01)
(Continued)

(52) U.S. Cl.
CPC ......... *G01S 17/931* (2020.01); *B60W 60/001* (2020.02); *G01S 7/4808* (2013.01);
(Continued)

(58) Field of Classification Search
CPC ......... G01S 7/481–4818; G01S 7/4972; G01S 17/936; G01S 17/88; G01S 17/93; G01S 17/89; G01S 17/895; G01S 7/4808; G01S 17/931; G05D 1/0088; G05D 1/0238–024; G05D 2201/0213; G06K 7/11; G06K 9/00201; G06K 9/34–348; G06K 2207/20021; G06K 2207/30248–30264; G06K 9/6227; G06T 7/11; G06T 7/70–77; G06T 7/10–194; G06T 7/60–77;
(Continued)

(56) References Cited

U.S. PATENT DOCUMENTS 5,487,117 A    1/1996    Burges et al.
8,605,998 B2    12/2013    Samples et al.
(Continued)

FOREIGN PATENT DOCUMENTS

CN    102663237 A    9/2012

OTHER PUBLICATIONS

M. S. Reis, E. Pantalerro, S. J. de Siqueira Sant'Anna and L. V. Dutra, "Proposal of a weighted index for segmentation evaluation,"; 2014 IEEE Geoscience and Remote Sensing Symposium, Quebec City, QC, 2014, pp. 3742-3745.; doi: 10.1109/IGARSS.2014.6947297 (Year: 2014).*
(Continued)

*Primary Examiner* — Jeffrey C Boomer
*Assistant Examiner* — Paul Allen
(74) *Attorney, Agent, or Firm* — Medley, Behrens & Lewis, LLC

(57) ABSTRACT

An autonomous vehicle generates segmentation scenes based upon lidar data generated by a lidar sensor system of the autonomous vehicle. The lidar data includes points indicative of positions of objects in a driving environment of the autonomous vehicle. The segmentation scenes comprise regions that are indicative of the objects in the driving environment. The autonomous vehicle generates scores for each segmentation scene based upon characteristics of each segmentation scenes and selects a segmentation scene based upon the scores. The autonomous vehicle then operates based upon the segmentation scene.

20 Claims, 14 Drawing Sheets

(51) Int. Cl.
| | | |
|---|---|---|
| *G06T 7/70* | (2017.01) | |
| *G01S 7/48* | (2006.01) | |
| *B60W 60/00* | (2020.01) | |
| *B60W 10/06* | (2006.01) | |
| *B60W 10/20* | (2006.01) | |
| *B60W 10/18* | (2012.01) | |

(52) U.S. Cl.
CPC .................. *G06T 7/11* (2017.01); *G06T 7/70* (2017.01); *B60W 10/06* (2013.01); *B60W 10/18* (2013.01); *B60W 10/20* (2013.01); *B60W 2420/52* (2013.01); *B60W 2554/4023* (2020.02); *B60W 2554/4026* (2020.02); *B60W 2554/4029* (2020.02); *G06T 2207/10028* (2013.01); *G06T 2207/30261* (2013.01)

(58) Field of Classification Search
CPC ........... G06T 2207/30261; G06T 2207/10028; B60W 10/18; B60W 10/20; B60W 10/06; B60W 60/001; B60W 2554/4026; B60W 2554/4023; B60W 2420/52; B60W 2554/4029
USPC ..................................................... 701/23–28
See application file for complete search history.

(56) References Cited

U.S. PATENT DOCUMENTS

| | | | |
|---|---|---|---|
| 8,849,494 B1 | 9/2014 | Herbach et al. | |
| 9,616,886 B2 | 4/2017 | Mei et al. | |
| 10,133,951 B1* | 11/2018 | Mendonca | ............. G06K 9/325 |
| 2005/0093735 A1* | 5/2005 | Samukawa | ............... B60T 7/22 |
| | | | 342/70 |
| 2014/0118716 A1 | 5/2014 | Kaganovich | |
| 2014/0350835 A1 | 11/2014 | Martin | |
| 2017/0242117 A1* | 8/2017 | Izzat | ....................... G01S 17/86 |
| 2017/0287170 A1* | 10/2017 | Perona | .............. G06K 9/00791 |
| 2018/0075320 A1* | 3/2018 | Zermas | ............. G06K 9/00805 |
| 2018/0089505 A1* | 3/2018 | El-Khamy | ................ G06T 7/73 |
| 2018/0300882 A1* | 10/2018 | Kim | ........................ G06T 7/143 |
| 2018/0307921 A1* | 10/2018 | Vallespi-Gonzalez | ...................... |
| | | | G06K 9/00369 |
| 2018/0348346 A1* | 12/2018 | Vallespi-Gonzalez | ...................... |
| | | | G01S 7/4861 |
| 2018/0349746 A1* | 12/2018 | Vallespi-Gonzalez | ...................... |
| | | | G06K 9/6277 |
| 2019/0051006 A1* | 2/2019 | Chattopadhyay | ........ G06T 7/521 |
| 2019/0164313 A1* | 5/2019 | Ma | ........................ G06K 9/6256 |
| 2019/0179023 A1* | 6/2019 | England | ............... G05D 1/0231 |
| 2019/0258737 A1* | 8/2019 | Wang | .................. G06F 16/2379 |
| 2019/0266418 A1* | 8/2019 | Xu | ........................ G06K 9/00718 |
| 2019/0291720 A1* | 9/2019 | Xiao | ................... G06K 9/00805 |
| 2019/0303686 A1* | 10/2019 | Guo | .................... G06K 9/00785 |
| 2019/0353774 A1* | 11/2019 | Chondro | ................ G01S 13/931 |

OTHER PUBLICATIONS

NOAA—What is Lidar—archive.org capture from May 30, 2013, retrieved on Apr. 7, 2020 (Year: 2013).*

D. Lin, S. Fidler and R. Urtasun, "Holistic Scene Understanding for 3D Object Detection with RGBD Cameras," 2013 IEEE International Conference on Computer Vision, Sydney, NSW, 2013, pp. 1417-1424, doi: 10.1109/ICCV.2013.179. (Year: 2013).*

J.H. Bappy and A. K. Roy-Chowdhury, "Inter-dependent CNNs for joint scene and object recognition," 2016 23rd International Conference on Pattern Recognition (ICPR), Cancun, 2016, pp. 3386-3391, doi: 10.1109/ICPR.2016.7900157. (Year: 2016).*

* cited by examiner

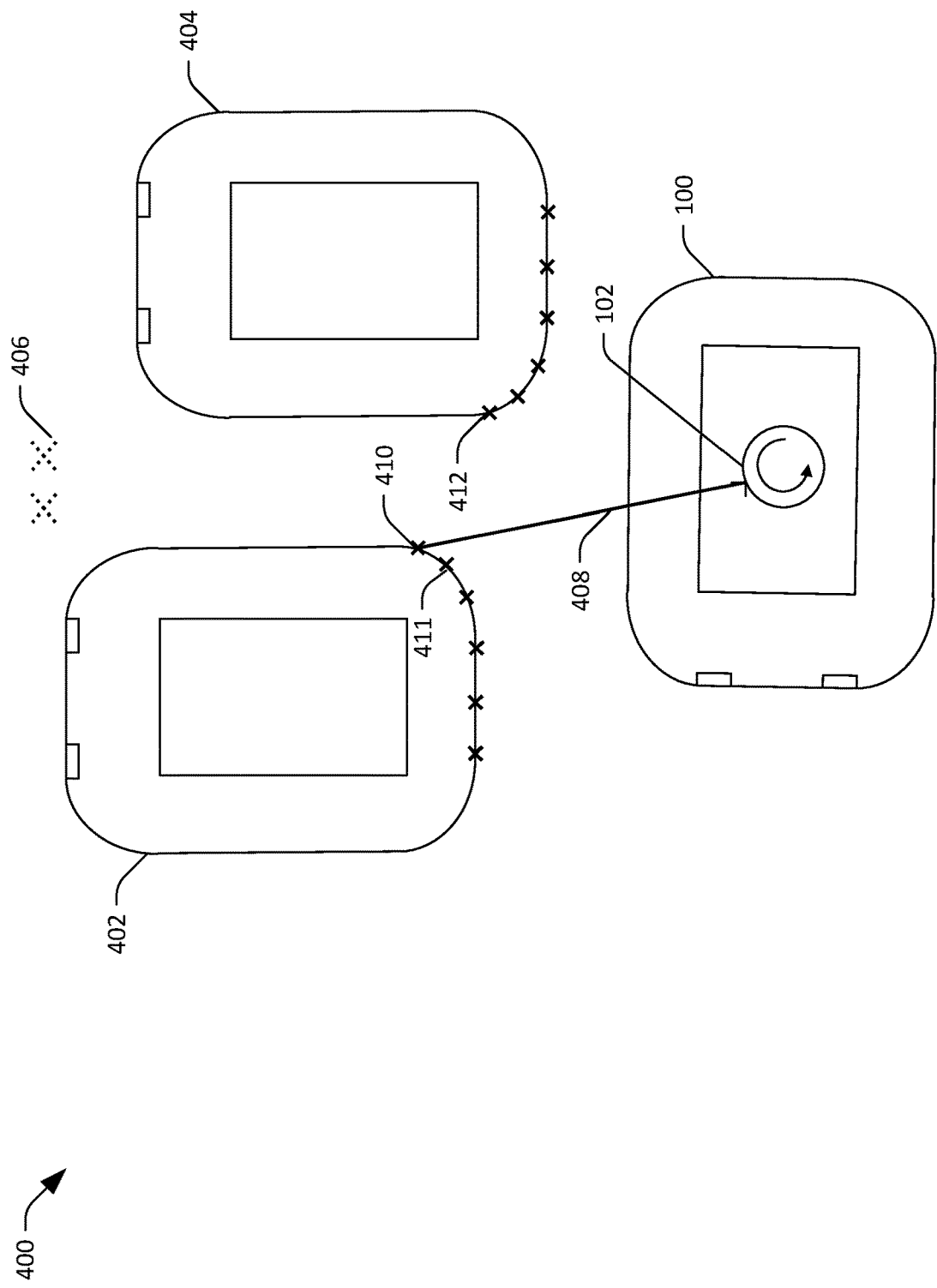

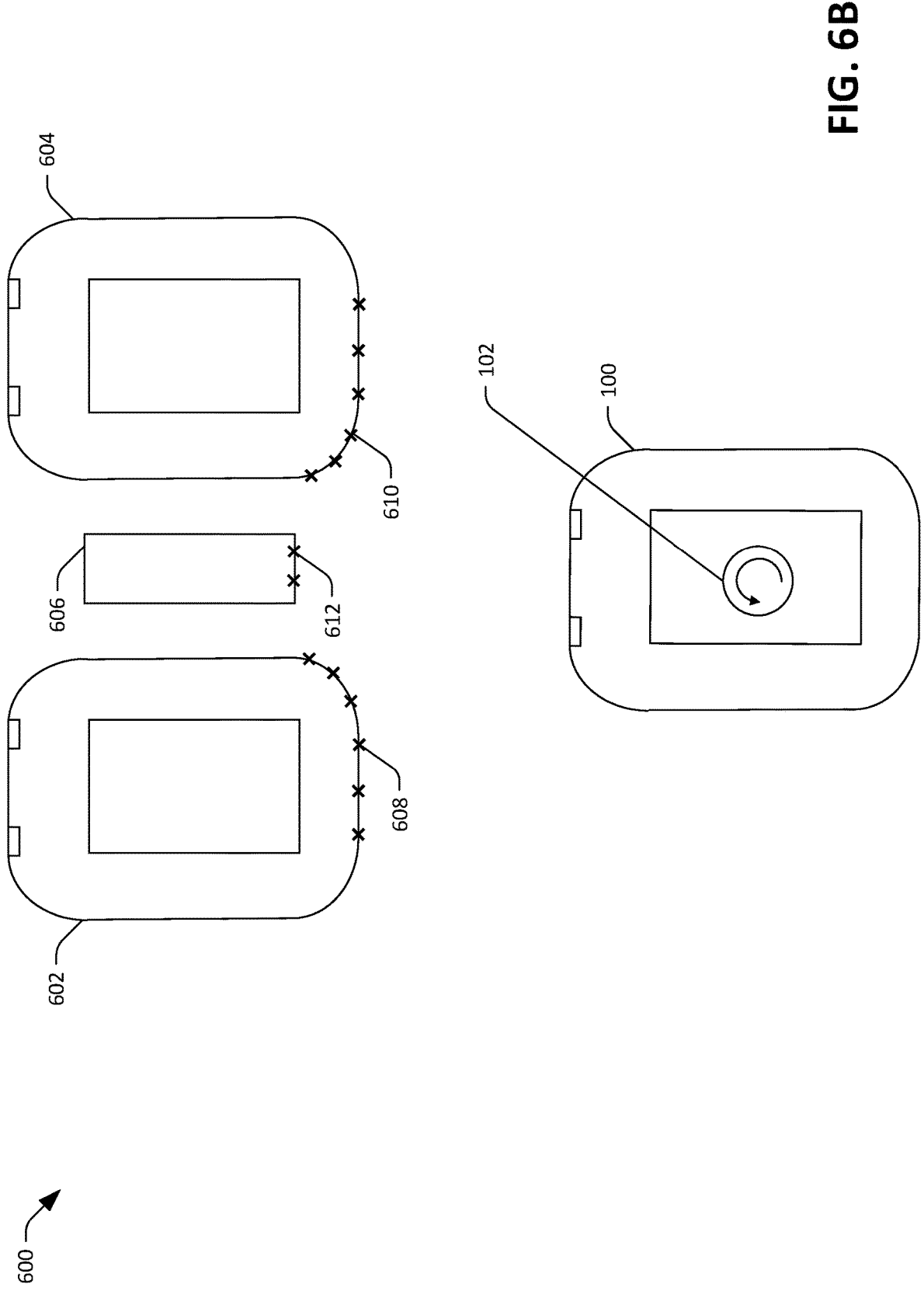

CONFLICT RESOLVER FOR A LIDAR DATA SEGMENTATION SYSTEM OF AN AUTONOMOUS VEHICLE

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Conventionally, autonomous vehicles are configured to identify locations of different objects in a driving environment based upon different sensor signals. For example, a radar system can identify a range from the autonomous vehicle to another vehicle in the driving environment. In another example, an object recognition system may be configured to receive images output by a camera and to identify relative positions of objects captured in the images.

In some situations, however, it may be difficult to determine what objects are at which locations based upon the sensor signals output by the sensor systems of the autonomous vehicle. For instance, in the driving environment of the autonomous vehicle, similar yet distinct objects may be positioned close together (e.g., a group of several pedestrians standing together at a street corner). In a lidar point cloud representative of the driving environment, it may be difficult to determine whether two points are representative of distinct objects or a same object among similar, closely-spaced objects. Conventionally, an autonomous vehicle may determine whether the two points are representative of distinct objects or the same object by measuring a distance between the two points. For example, an algorithm may identify the two points in the lidar point cloud as belonging to the same object based upon the points being within 50 centimeters of one another. This conventional approach may not be robust to variations in the driving environment, and can result in possible errors with respect to object identification by the autonomous vehicle. For instance, the conventional approach may result in a first object and a second object being misclassified as a single object when points corresponding to the first object and the second object are close to one another in the lidar point cloud, such as when the first object and the second object are cars that are parked next to one another.

SUMMARY

The following is a brief summary of subject matter that is described in greater detail herein. This summary is not intended to be limiting as to the scope of the claims.

Disclosed herein are various technologies pertaining to controlling operation of an autonomous vehicle. With more specificity, described herein are various technologies pertaining to segmentation of a lidar point cloud, wherein the lidar point cloud comprises points representative of positions of objects in a driving environment of the autonomous vehicle at one or more points in time. With still more specificity, a lidar data segmentation system is described herein, wherein the lidar data segmentation system generates different segmentation scenes based upon the lidar point cloud, wherein the segmentation scenes comprise regions corresponding to objects in the driving environment. Also described herein is a lidar conflict resolver for the segmentation scenes which is configured to generate scores for the segmentation scenes and, based on the scores, select a segmentation scene in the segmentation scenes on which the autonomous vehicle is to base its operation.

The autonomous vehicle comprises an engine, a braking system, a steering system, a lidar sensor system comprising at least one lidar sensor, and a computing system. The computing system is in communication with the engine, the braking system, the steering system, and the lidar sensor system, as well as the articulating sensor. The lidar sensor system outputs lidar data to the lidar segmentation system. The lidar data comprises points representative of positions of objects in the driving environment. In an embodiment, the lidar data comprises a three-dimensional lidar point cloud, wherein each point in the point cloud indicates a three-dimensional position of an object or surface of an object in the driving environment of the autonomous vehicle. In an example, the points include a first point and a second point. The lidar segmentation system segments the lidar data by generating a plurality of segmentation scenes based upon the lidar data using different segmentation approaches. A segmentation scene in the plurality of segmentation scenes comprises a plurality of regions, wherein each region in the plurality of regions is indicative of an object in the driving environment of the autonomous vehicle. In an example, the plurality of regions may include a first region indicative of a first vehicle in a driving environment of the autonomous vehicle and a second region indicative of a second vehicle in the driving environment of the autonomous vehicle. The plurality of regions may also include regions that are devoid of objects (i.e., empty space around the objects).

In an exemplary segmentation approach, the lidar segmentation system generates a raster based upon the lidar data. In an example in which the lidar data includes a first point and a second point, the raster includes a first pixel indicative of a first distance of the first point to the autonomous vehicle and a second pixel indicative of a second distance of the second point to the autonomous vehicle. The lidar segmentation system determines a difference between the first distance between the first point and the autonomous vehicle and the second distance between the second point and the autonomous vehicle. The lidar segmentation system may determine that the difference between the first distance and the second distance exceeds a threshold value, and therefore the first point and the second point belong to different objects. The lidar segmentation system generates a segmentation scene based upon the difference. The segmentation scene comprises a first region assigned to a first object in the driving environment and a second region assigned to a second object in the driving environment. The first region includes the first point and the second region includes the second point.

With more specificity, the lidar segmentation system may generate the segmentation scene by forming a convex hull over pixels in the raster. For instance, the points may include a third point that is on a surface of the first object, and as a result the raster may include a third pixel that is indicative of a third distance of the third point to the autonomous vehicle. The lidar segmentation system may calculate a second difference between a position of the first pixel and a position of the third pixel within the raster. The lidar segmentation system may then determine that the first point and the third point belong to the first region when the second difference is below a second threshold value. The lidar segmentation system may then form the convex hull over the first pixel and the third pixel, thereby forming the first region.

The points in the lidar data may include a fourth point, and as such the raster may further include a fourth pixel indicative of a fourth distance of the fourth point to the autonomous vehicle. The fourth pixel may be located between the first pixel and the second pixel within the raster. For instance, the fourth pixel may be collinear with the first pixel and the second pixel. The fourth distance may be greater than at least one of the first distance or the second distance. The lidar segmentation system may determine that a third difference between the first distance between the first point and the autonomous vehicle and the fourth distance between the fourth point and the autonomous vehicle exceed the threshold value. In an example, when the third difference exceeds the threshold value, the lidar segmentation system may determine that empty space exists between the first point and the second point, and as such the first region and the second region are indicative of different objects (i.e., the first object and the second object) in the driving environment. In another example, the lidar segmentation system may determine that the fourth point belongs to a third object in the driving environment, such as a pedestrian, and as such the segmentation scene may further include a third region located on a scan line between the first region and the second region.

Concurrently with or subsequent to generating the segmentation scene, the lidar segmentation system may also assign a label to the first region and the second region, respectively, wherein the label is indicative of a type of object. The label may be assigned based upon shapes of the regions in the segmentation scene. For instance, the type of object may be a car, a truck, a motorcycle, a bicycle, a bus, a static object (i.e., non-moving), or a pedestrian.

The autonomous vehicle may then control at least one of the engine, the braking system, or the steering system during operation of the autonomous vehicle based upon the segmentation scene and/or the labels assigned to the regions in the segmentation scene. The autonomous vehicle may also control the articulating sensor based upon the segmentation scene. The autonomous vehicle may also control (based upon the segmentation scene) an articulating sensor of the autonomous vehicle such that the articulating sensor remains directed towards at least one of the first object or the second object.

In another segmentation approach, the autonomous vehicle may utilize prior segmentation scenes in order to more accurately segment a current lidar point cloud by generating a resolved segmentation scene. The lidar segmentation system generates a first segmentation scene at a first timestamp based upon a first lidar point cloud generated by the lidar sensor system. The first lidar point cloud includes a first point and a second point. The first segmentation scene comprises a first region including the first point and a second region including the second point. The first region is indicative of a first object in the driving environment at the first timestamp and the second region is indicative of a second object in the driving environment at the first timestamp. The autonomous vehicle may determine a predicted path of at least one of the first object or the second object based upon the first segmentation scene (as well as other data produced by other sensor systems of the autonomous vehicle).

Subsequently, the lidar sensor system outputs a second lidar point cloud at a second timestamp occurring after the first timestamp. Responsive to receiving the second lidar point cloud, the lidar segmentation system generates a second segmentation scene for the second timestamp. In an example, the second segmentation scene fails to include separate regions indicative of the first object and the second object. For instance, the second segmentation scene may be indicative of a single object.

Responsive to determining that the second segmentation scene fails to include the regions indicative of the first object and the second object, the lidar segmentation system generates a resolved segmentation scene for the second timestamp based upon the first segmentation scene and the second segmentation scene, as well as any predicted paths of the first object and/or the second object. The resolved segmentation scene includes the separate regions indicative of the first object and the second object at the second timestamp.

The autonomous vehicle may then control its operation based upon the resolved segmentation scene by controlling at least one of the engine, the braking system, or the steering system. The autonomous vehicle may also control operation of the articulating sensor based upon the resolved segmentation scene.

Other approaches that may be used to segment the lidar data include performing a Hough transform over the lidar data to generate a segmentation scene, a glancing line approach, and point-to-point distance-based approaches (i.e., Euclidean clustering, flood-fill, etc.), as well as neural net based approaches. In a glancing line approach, collinear points in a lidar point cloud are identified, and the lidar point cloud is segmented based upon the collinear points. Furthermore, the segmentation approaches may include approaches that are tailored for certain types of objects in the driving environment. For instance, the segmentation approaches may include an approach designed for cars, an approach designed for pedestrians, etc.

It is to be understood that different segmentation approaches may result in different segmentation scenes for the same lidar data. For instance, a first segmentation approach may generate a first segmentation scene based on lidar data indicating that a single object is in the driving environment of the autonomous vehicle, whereas a second segmentation approach may generate a second segmentation scene based on the (same) lidar data indicating that a first object and a second object are in the driving environment. As such, the autonomous vehicle utilizes a lidar conflict resolver to resolve discrepancies between the first segmentation scene produced by the first segmentation approach and the second segmentation scene produced by the second segmentation approach.

In operation, the lidar segmentation system generates a plurality of segmentation scenes based on a plurality of (different) segmentation approaches. Each segmentation approach in the plurality of segmentation approaches utilizes lidar data. Each segmentation scene in the plurality of segmentation scenes comprises a plurality of regions. Each region in the plurality of regions may be indicative of an object in the driving environment of the autonomous vehicle.

The lidar conflict resolver then generates scores for each segmentation scene in the plurality of segmentation scenes based upon a scoring function. The scoring function outputs the scores based upon characteristics of the plurality of regions for each segmentation scene. More specifically, in an embodiment, each region in the regions for a segmentation scene may be a rectangular box. The characteristics may include a length of each box, a width of each box, a size of gaps between each box, and a number of boxes in the segmentation scene. Different boxes may be assigned positive or negative sub-scores based upon their respective characteristics. For instance, if a region has a geometry that is identified as unlikely to correspond to an object, the lidar conflict resolver may assign the region a negative sub-score, and if the region has a geometry that is identified as likely to correspond to an object, the lidar conflict resolver may assign the region a positive sub-score. In an embodiment, the lidar conflict resolver may generate a score for the segmentation scene by summing sub-scores for each box. Moreover, in another embodiment, segmentation scenes generated by certain segmentation approaches may be assigned a weight, and the score for the certain segmentation approaches may be further based upon the weight.

The lidar conflict resolver then selects a segmentation scene from amongst the plurality of segmentation scenes based upon the scores. For instance, the lidar conflict resolver may select the segmentation scene having the greatest score amongst the scores. The autonomous vehicle then controls at least one of the engine, the braking system, or the steering system during operation of the autonomous vehicle in the driving environment.

The above-described technologies present various advantages over conventional lidar segmentation techniques. First, the above-described technologies enable detection of separate objects even when the objects are close together and would not be distinguishable using a point-to-point distance approach. Second, the lidar conflict resolver described above enables conflicts between different segmentation scenes to be resolved, thus enabling the autonomous vehicle to base its operation on a more accurate representation of the driving environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4A is a top-down view of an exemplary driving environment of an autonomous vehicle including two objects.

FIG. 6B is a top-down view of the exemplary driving environment depicted in FIG. 6A after the third object has entered an area between the first object and the second object.

DETAILED DESCRIPTION

Figure 1:
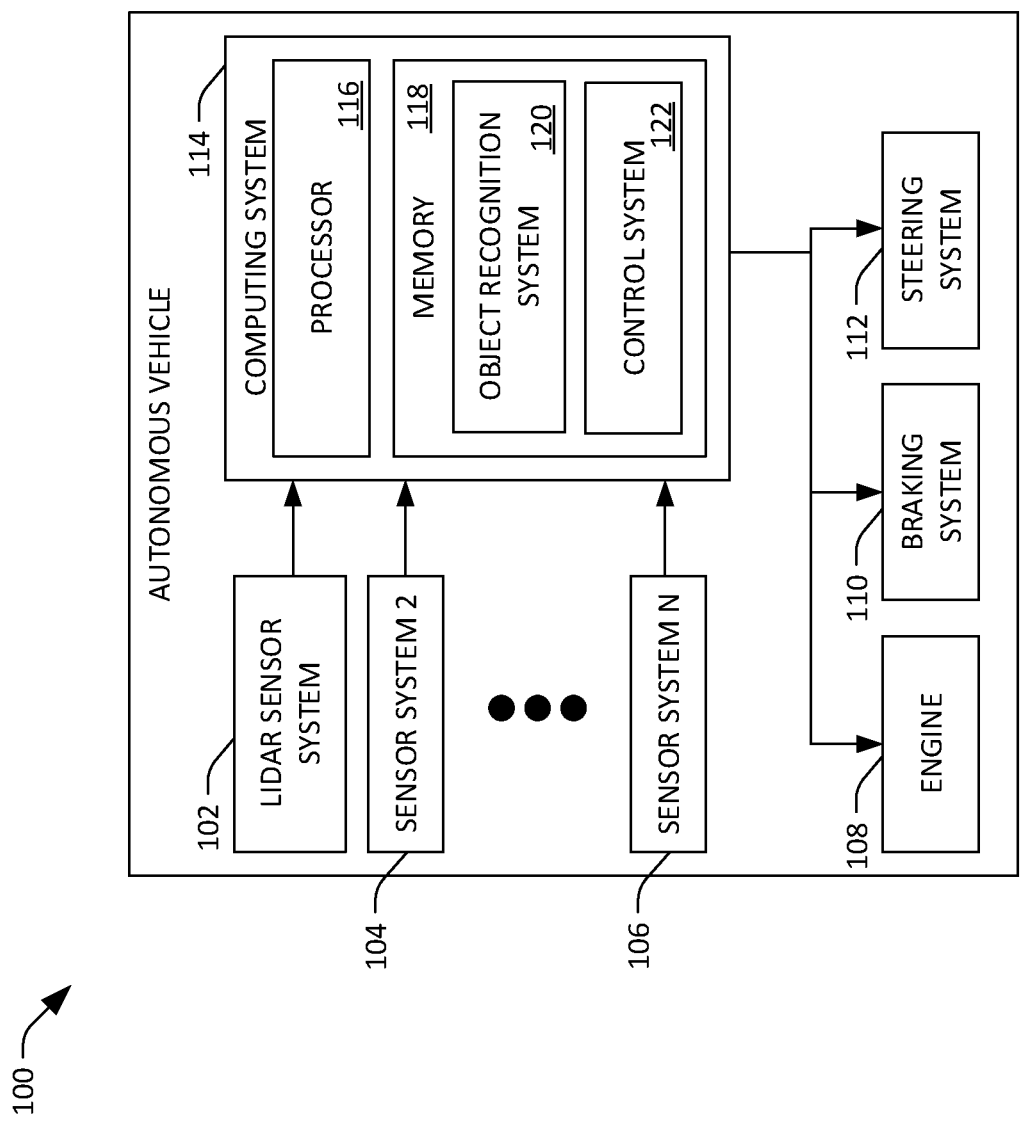
FIG. 1 illustrates an exemplary autonomous vehicle.

Various technologies pertaining to lidar segmentation performed by an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a lidar sensor system 102 and a plurality of additional sensor systems 104-106 (a second sensor system 104 through an Nth sensor system 106). The sensor systems 104-106 may be of different types and are arranged about the autonomous vehicle 100. For example, the second sensor system 104 may be a radar sensor system and the Nth sensor system 106 may be a camera (image) system. Other exemplary sensor systems include, GPS sensor systems, sonar sensor systems, infrared sensor systems, and the like.

The lidar sensor system 102 and each sensor system in the plurality of additional sensor systems 104-106 may comprise multiple sensors. For example, the lidar sensor system 102 may comprise a first lidar sensor, a second lidar sensor, etc. Furthermore, some or all of the sensors in the lidar sensor system 102 (and the plurality of sensor systems 104-106) may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, an engine 108, a braking system 110, and a steering system 112. The engine 108 may be an electric engine or a combustion engine. The braking system 110 can include an engine brake, brake pads, actuators, and/or any other suitable componentry that is configured to assist in decelerating the autonomous vehicle 100. The steering system 112 includes suitable componentry that is configured to control the direction of movement of the autonomous vehicle 100.

The autonomous vehicle 100 additionally comprises a computing system 114 that is in communication with the lidar sensor system 102 and the additional sensor systems 104-106 and is further in communication with the engine 108, the braking system 110, and the steering system 112. The computing system 114 includes a processor 116 and memory 118 that includes computer-executable instructions that are executed by the processor 116. In an example, the processor 116 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Figure 2:
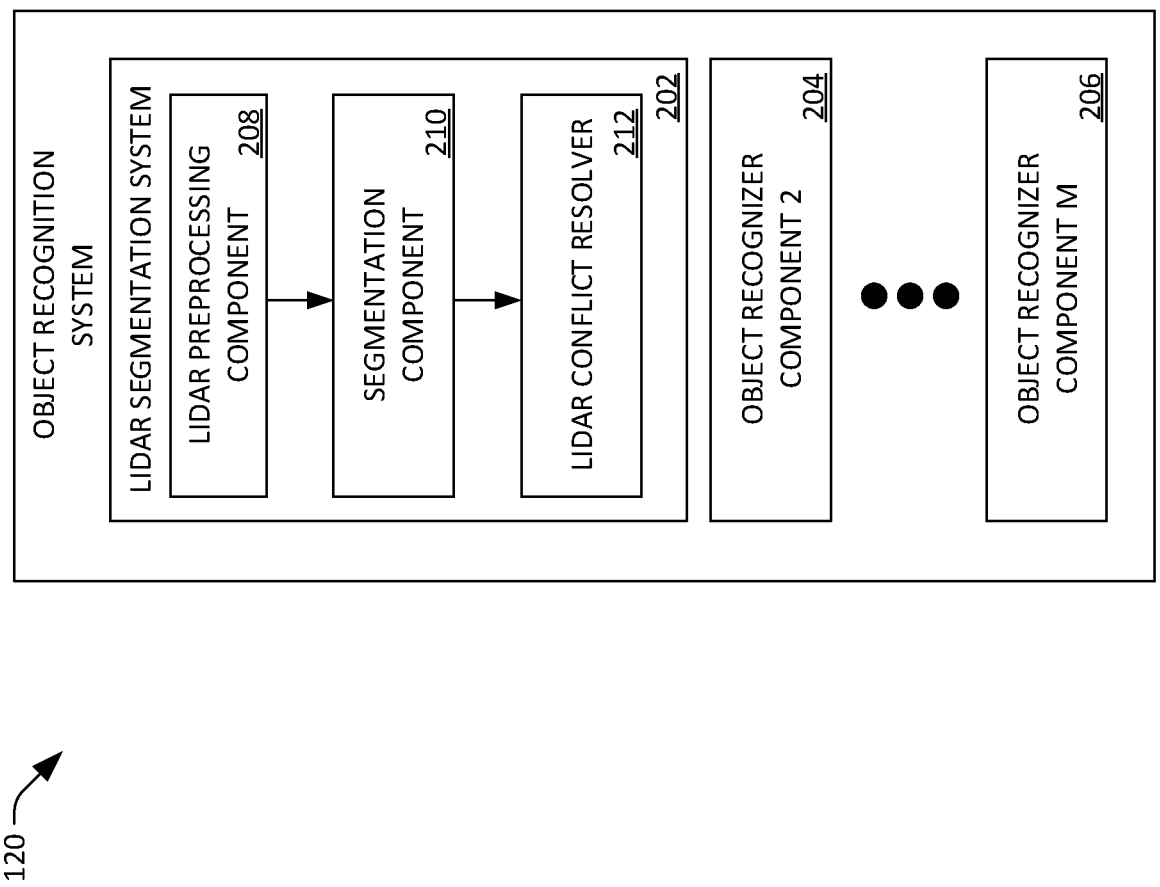
FIG. 2 is a functional block diagram of an exemplary object recognition system included within an autonomous vehicle.

The memory 118 comprises an object recognition system 120 that is configured to identify objects (in proximity to the autonomous vehicle 100) captured in sensor signals output by the sensor systems 102-106. Referring briefly now to FIG. 2, the object recognition system 120 includes a lidar segmentation system 202, and may further include a plurality of additional object recognition components 204-206 (a second object recognition component 204 through an Mth object recognition component 206), wherein the lidar segmentation system 202 and the object recognition components 204-206 are configured to output data indicative of positions and/or predefined types of objects in a driving environment of the autonomous vehicle 100. These predefined types of objects can include, but are not limited to, pedestrian, bike, car, truck, bus, motorcycle, and static (unknown), where the type "static" can represent telephone poles, construction equipment, etc. Each of the object recognizer components 202-206 independently generates output based upon at least one sensor signal. For instance, the lidar segmentation system 202 outputs data indicative of positions of objects in the driving environment of the autonomous vehicle 100 based upon lidar data output by the lidar sensor system 102. In further examples, the second object recognizer component 204 outputs data indicative of types of objects based upon images output by a camera, the Mth object recognizer component 206 outputs data indicative of ranges to objects based upon radar signals, etc.

The lidar segmentation system 202 further comprises a lidar preprocessing component 208, a segmentation component 210, and a lidar conflict resolver 212. The lidar segmentation system 202 receives lidar data from the lidar sensor system 102, wherein the lidar data is indicative of positions of objects or surfaces of objects in a driving environment of the autonomous vehicle 100. The lidar preprocessing component 208 may perform various processing operations over the lidar data (e.g., down-sampling, up-sampling, noise removal operations, etc.) and may output processed lidar data to the segmentation component 210. It is to be understood that in certain embodiments the lidar preprocessing component 208 may be optional and the segmentation component 210 may operate directly on the lidar data without preprocessing.

Figure 3:
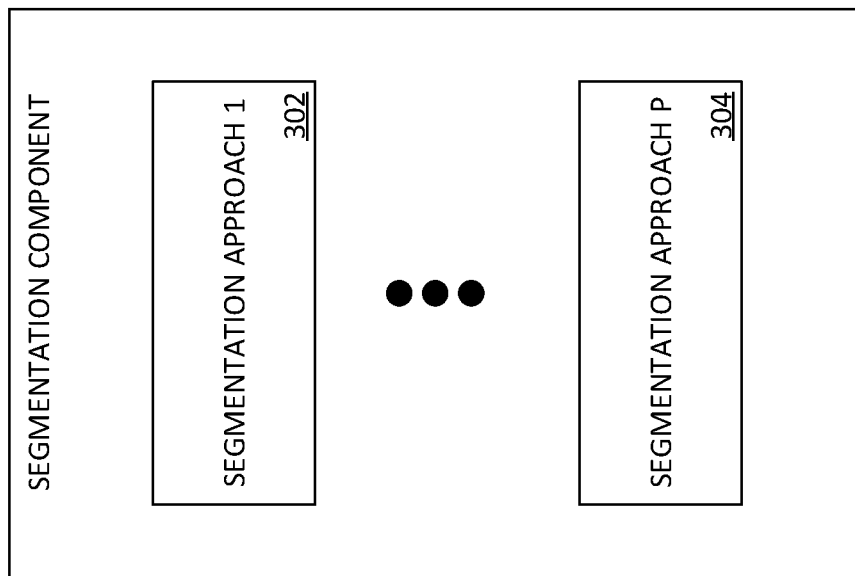
FIG. 3 is a functional block diagram of an exemplary segmentation component of an exemplary object recognition system included within an autonomous vehicle.

Turning briefly now to FIG. 3, the segmentation component 210 comprises a plurality of segmentation approaches 302-304 for lidar data (a first segmentation approach 302 through a Pth segmentation approach 304). As will be described in greater detail below, a segmentation approach takes lidar data as input and generates a segmentation scene based upon the lidar data (and optionally, other data as well). A segmentation scene comprises regions in the driving environment of the autonomous vehicle 100 representing objects around the autonomous vehicle 100. Certain regions in the regions of a segmentation scene may correspond to empty space in the driving environment. It is to be understood that different segmentation approaches may generate different segmentation scenes using the same lidar data. For instance, the first segmentation approach 302 may generate a first segmentation scene that is indicative of a single object in the driving environment of the autonomous vehicle 100 and the Pth segmentation approach 304 may generate a Pth segmentation scene that is indicative of two different objects in the driving environment of the autonomous vehicle 100.

It is also to be understood that different segmentation approaches may be more advantageous (i.e., more likely to correctly segment lidar data) in driving environments including different types of objects. For instance, the first segmentation approach 302 may be advantageous in driving environments including buses, whereas the Pth segmentation approach 304 may be advantageous in driving environments including pedestrians.

The plurality of segmentation approaches 302-304 may include, but are not limited to, a raster-based approach (described below), a history based approach (described below), performing a Hough transform over the lidar data to generate a segmentation scene, a glancing line approach, and point-to-point distance-based approaches (i.e., Euclidean clustering, flood-fill, etc.), as well as neural net based approaches. In a glancing line approach, collinear points in a lidar point cloud are identified, and the lidar point cloud is segmented based upon the collinear points. Furthermore, the segmentation approaches may include approaches that are tailored for certain types of objects in the driving environment. For instance, the segmentation approaches may include an approach designed for cars, an approach designed for pedestrians, etc.

Turning back to FIG. 2, the lidar segmentation system 202 further comprises a lidar conflict resolver 212. As will be described in greater detail below, the lidar conflict resolver 212 is generally configured to receive a plurality of segmentation scenes from the segmentation component 210, calculate scores for each segmentation scene using a scoring function, and select a segmentation scene in the plurality of segmentation scenes based upon the scores (e.g., a segmentation scene having the highest or lowest score amongst the scores).

Turning back to FIG. 1, the memory 118 additionally includes a control system 122 that is configured to receive output of the object recognition system 120 (e.g., a segmentation scene), and is further configured to control at least one of the mechanical systems of the autonomous vehicle 100

(the engine 108, the braking system 110, and/or the steering system 112) based upon the output of the object recognition system 120.

Figure 4B:
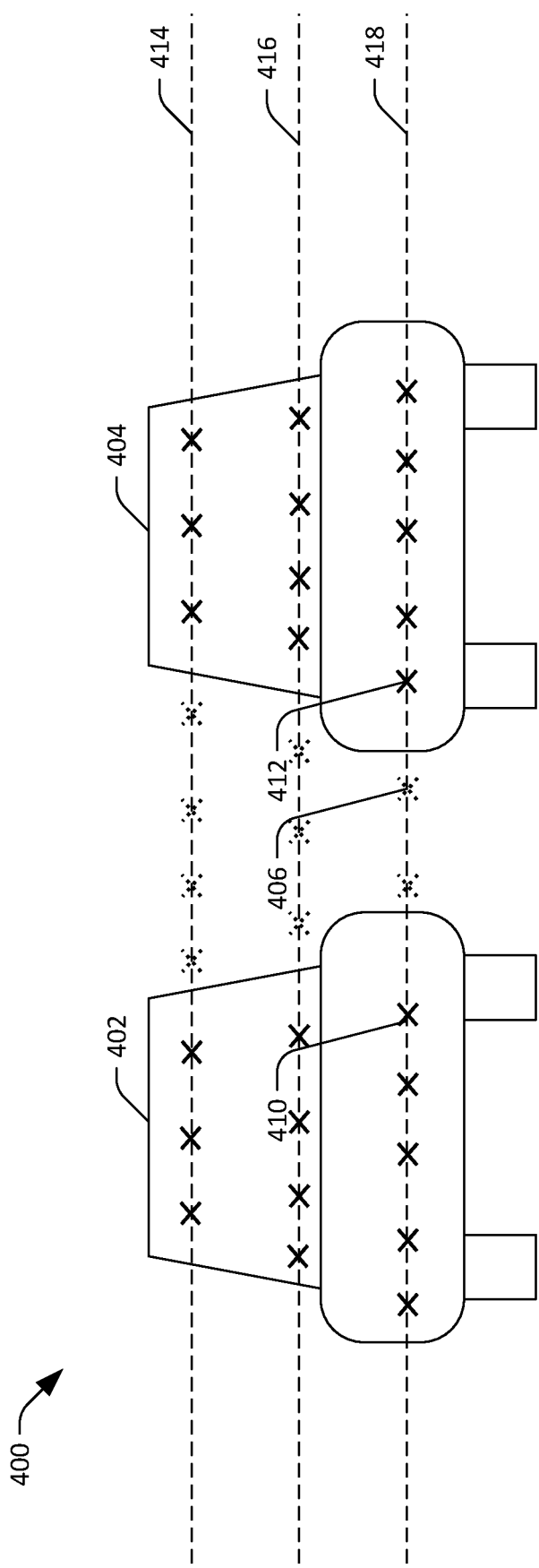
FIG. 4B is a side view of the exemplary driving environment depicted in FIG. 4A.

Exemplary operation of the autonomous vehicle 100 is now set forth. FIGS. 4A and 4B depict different views of an exemplary driving environment 400 in which the autonomous vehicle 100 operates. With reference now to FIG. 4A, the autonomous vehicle 100 is depicted in the driving environment 400, wherein the driving environment 400 includes a first vehicle 402 (i.e., a first object) and a second vehicle 404 (i.e., a second object). The first vehicle 402 includes a first point 410 located on a surface of the first vehicle 402 and the second vehicle 404 includes a second point 412 located on a surface of the second vehicle 404. The first vehicle 402 may also include a third point 411 located on a surface of the first vehicle 402. It is contemplated that the first vehicle 402 and the second vehicle 404 are located near one another. For instance, the first vehicle 402 and the second vehicle 404 may be parked adjacent to one another.

The driving environment 400 may also include a fourth point 406. In an example, the fourth point 406 may be a point on a pedestrian that is located between the first vehicle 402 and the second vehicle 404. In another example, empty space may exist between the first vehicle 402 and the second vehicle 404, and as such the fourth point 406 may be a point on an object that is distant from the first vehicle 402 and the second vehicle 404.

The autonomous vehicle 100 emits a laser beam 408 into the driving environment 400 (e.g., by way of the lidar sensor system 102). The laser beam 408 is scanned 360° around the vehicle 100, and impinges upon the various objects in the environment 300 (e.g., the first vehicle 402 and the second vehicle 404). The lidar sensor system 102 receives reflections of the beam 408, and based upon such reflections outputs data indicative of positions of a plurality of points of intersection of the beam 408 with the vehicles 402-404 in the driving environment 400. By way of example, the lidar sensor system 102 outputs data indicating a three-dimensional position of each of the points relative to the autonomous vehicle 100.

It is to be understood that while a single laser beam 408 and a plurality of points of intersection of the beam 408 with objects 402-404 are depicted in FIG. 4A, the lidar sensor system 102 can emit a plurality of laser beams into the driving environment 400 of the autonomous vehicle 100. For instance, and referring now to FIG. 4B, a side view of the vehicles 402-404 in the driving environment 400 is depicted. In exemplary embodiments, the lidar sensor system 102 emits a plurality of laser beams into the driving environment 400 of the vehicle 100, wherein each of the beams has a different angular alignment with respect to a horizontal reference plane of the vehicle 100. Further, each of a plurality of sensors in the lidar sensor system 102 may be aligned with a different respective lidar beam emitted by the lidar sensor system 102, such that the lidar sensor system 102 outputs lidar data indicative of a plurality of points of intersection for each of the plurality of beams over a period of time. As depicted in FIG. 4B, the plurality of laser beams scan across the vehicles 402-404 in the driving environment 400 and intersect the objects along scan lines 414-418. Each of the points where a laser beam of the lidar sensor system 102 intersects one of the vehicles 402-404 in the driving environment lies along one of the scan lines 414-418. Hence, each of the plurality of lidar sensors in the lidar sensor system 102 outputs data indicative of a point of intersection of a respective laser beam with various objects in the driving environment 400 along a respective scan line.

The lidar segmentation system 202 (by way of the segmentation component 210) then generates a raster based upon lidar data generated by the lidar sensor system 102. The raster includes a first pixel indicative of a first distance of the first point 410 to the autonomous vehicle 100 and a second pixel indicative of a second distance of the second point 412 to the autonomous vehicle 100. The lidar segmentation system 202 then determines that a difference between the first distance between the first point and the autonomous vehicle 100 and the second distance between the second point and the autonomous vehicle exceeds a threshold value. When the difference between the first distance and the second distance exceeds the threshold value, the lidar segmentation system 202 determines that the first point 410 and the second point 412 belong to different objects in the driving environment 400 (i.e., the first vehicle 402 and the second vehicle 404). Likewise, if the difference between the first distance and the second distance fails to exceed the threshold value, the lidar segmentation system 202 may determine that the first point 410 and the second point 412 belong to a same object. In an embodiment, when the difference is within a margin of error of the threshold value, the lidar segmentation system 202 may be configured to determine that the first point 410 and the second 412 belong to different objects.

Accordingly, the lidar segmentation system 202 generates a segmentation scene based upon the difference and other points in the raster. The segmentation scene comprises a first region in the driving environment 400 assigned to the first vehicle 402 (i.e., a first object) and a second region in the driving environment 400 assigned to the second vehicle 404 (i.e., a second object). The first region includes the first point 410 and the second region includes the second point 412.

With more specificity, the lidar segmentation system 202 may generate the segmentation scene by forming a convex hull over pixels in the raster. For instance, the points in the lidar data may include the third point 411, and as a result the raster may include a third pixel that is indicative of a third distance of the third point 411 to the autonomous vehicle 100. The lidar segmentation system 202 may calculate a second difference between a position of the first pixel and a position of the third pixel within the raster. The lidar segmentation system 202 may then determine that the first point and the third point belong to the first region when the second difference is below a second threshold value. The lidar segmentation system 202 may then form the convex hull over the first pixel and the third pixel, thereby forming the first region.

The points in the lidar data may also include the fourth point 406, and as such the raster may further include a fourth pixel indicative of a fourth distance of the fourth point 406 to the autonomous vehicle 100. The fourth pixel may be located between the first pixel and the second pixel within the raster. For instance, the fourth pixel may be collinear with the first pixel and the second pixel. The fourth distance may be greater than at least one of the first distance or the second distance. The lidar segmentation system may determine that a third difference between the first distance between the first point and the autonomous vehicle and the fourth distance between the fourth point and the autonomous vehicle exceed the threshold value. In an example, when the third difference exceeds the threshold value, the lidar segmentation system 202 may determine that empty space exists between the first point 410 and the second point 412, and as such the first region and the second region are indicative of different objects (i.e., the first vehicle 402 and the second vehicle 404) in the driving environment 400. In another example, the lidar segmentation system 202 may determine, based upon the third difference, that the fourth point 406 belongs to a third object in the driving environment, such as a pedestrian, and as such the segmentation scene may include a third region located on a scan line between the first region and the second region.

Concurrently with or subsequent to generating the segmentation scene, the lidar segmentation system 202 may also assign a label to the first region and the second region, respectively, wherein the label is indicative of a type of object. The label may be assigned based upon geometries of the regions in the segmentation scene. For instance, the type of object may be a car, a truck, a motorcycle, a bicycle, a bus, a static object (i.e., non-moving), or a pedestrian.

The autonomous vehicle 100 may then operate based upon the segmentation scene by controlling (by way of the control system 122) at least one of the engine 108, the braking system 110, or the steering system 112. The autonomous vehicle 100 may also control an articulating sensor of the autonomous vehicle 100 based upon the segmentation scene such that the articulating sensor remains directed towards the first vehicle 402 and/or the second vehicle 404 as the autonomous vehicle moves about the driving environment 400.

While the above-described process has been described as determining whether points in a lidar point cloud (i.e., lidar data) belong to a single object or two different objects, it is to be understood that the above-described process may be employed to determine whether points in a lidar point cloud belong to many different objects in a driving environment. For instance, the above-described process may be utilized to determine whether a point in a point cloud (e.g., the fourth point 406) corresponds to a pedestrian moving between the first vehicle 402 and the second vehicle 404.

Figure 5:
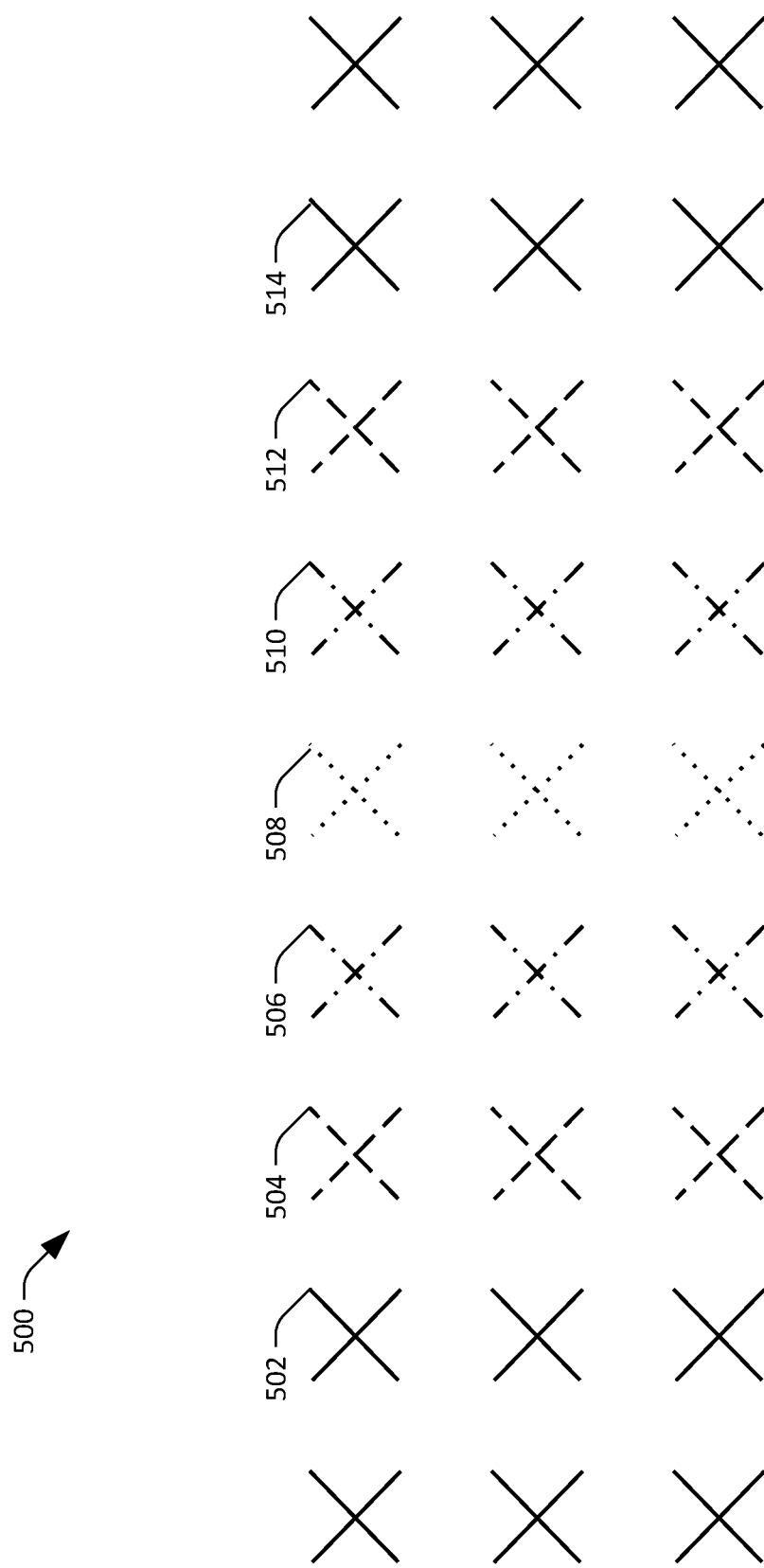
FIG. 5 is an exemplary raster generated from a point cloud.

With reference to FIG. 5, an exemplary raster 500 that can be generated by the autonomous vehicle 100 based on the lidar data is illustrated. The raster 500 comprises pixels 502-514 corresponding to points in a driving environment of the autonomous vehicle 100. The pixels 502-514 are indicative of a distance of the points to the autonomous vehicle 100. In an example, the pixels 502-506 may correspond to a convex surface of the first vehicle 402 and the pixels 510-514 may correspond to a convex surface of the second vehicle 404. The pixel 508 may correspond to a region devoid of objects (e.g., the fourth point 406).

The pixels 502-514 may be indicative of a gradient with respect to a distance of certain points to the autonomous vehicle 100. For example, the pixels 502-506 may correspond to points along a convex bumper on a rear of the autonomous vehicle 100. Distance from the autonomous vehicle 100 may be seen in intensity of the pixels 502-506. For instance, the pixel 502 may belong to a central point along the convex bumper that is closest to the autonomous vehicle 100, whereas the pixel 506 may belong to an area on a side of the convex bumper that is further from the autonomous vehicle 100 than the central point.

Figure 6A:
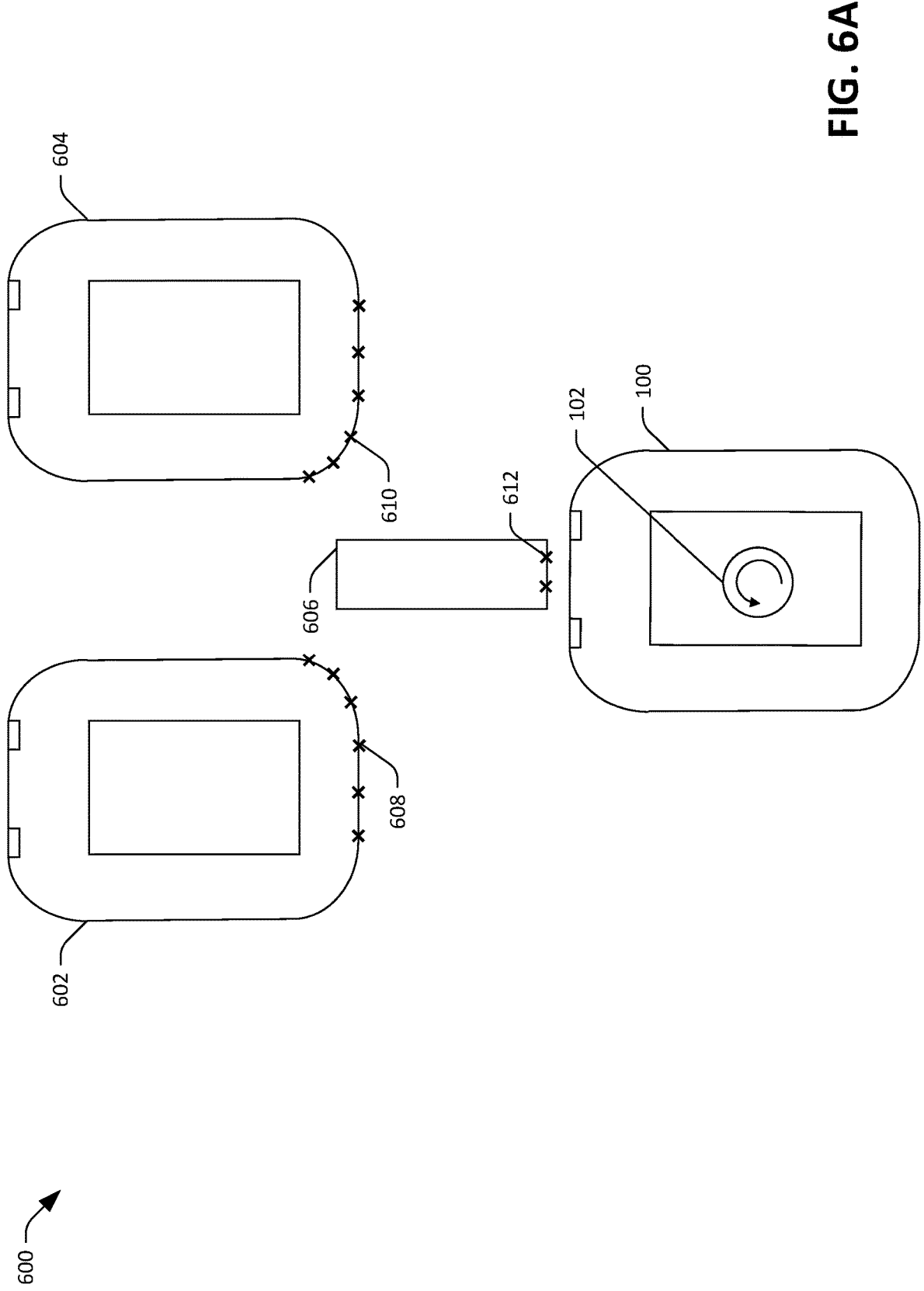
FIG. 6A is a top-down view of an exemplary driving environment of an autonomous vehicle including a first object, a second object, and a third object.

FIGS. 6A and 6B illustrate an exemplary driving environment 600 at a first timestamp and a second timestamp, respectively, wherein the first timestamp occurs prior to the second timestamp. The driving environment includes a first object 602, a second object 604, and a third object 606. In an example, the first object 602 and the second object 604 may be cars, and the third object 606 may be a motorcycle. The first object 602, the second object 604, and the third object 606 each include at least one point on their surfaces, that is, a first point 608, a second point 610, and a third point 612, respectively.

With reference now to FIG. 6A, an overhead view of the driving environment 600 at a first timestamp is depicted. As shown in FIG. 6A, the third object 606 is located in front of the autonomous vehicle 100 and behind the first object 602 and the second object 604. The autonomous vehicle 100 generates a first segmentation scene based upon a first lidar point cloud from the lidar sensor system 102 of the autonomous vehicle 100 at the first timestamp. In an example, the first segmentation scene may be generated using techniques described above in the discussion of FIGS. 4A and 4B. The first segmentation scene comprises a first region including the first point 608, a second region including the second point 610, and a third region including the third point 612. The autonomous vehicle 100 may determine predicted paths of the objects 602-606 based upon the first segmentation scene. For instance, the autonomous vehicle 100 may determine a predicted path for the third object 606.

Turning now to FIG. 6B, an overhead view of the driving environment 600 at a second timestamp is depicted. As shown in FIG. 6B, the third object 606 is now located between the first object 602 and the second object 604. The autonomous vehicle 100 generates a second segmentation scene based upon a second lidar point cloud from the lidar sensor system 102 of the autonomous vehicle 100 at the second timestamp. In an example, the second segmentation scene may fail to include separate regions indicative of the first object 602, the second object 604, and the third object 606. For instance, the second segmentation scene may include a single region encompassing the first object 602, the second object 604, and the third object 606.

Responsive to determining that the second segmentation scene fails to include the separate regions indicative of the first object 602, the second object 604, and the third object 606, the autonomous vehicle 100 may generate a resolved segmentation scene for the second timestamp. The resolved segmentation scene may be based on the first segmentation scene, the second segmentation scene, and the predicted paths of the objects 602-606. In an example, the first segmentation scene and/or the second segmentation scene may be assigned weights, and the resolved segmentation scene may be based upon the weights. The autonomous vehicle 100 then operates based upon the resolved segmentation scene. The autonomous vehicle 100 may also control an articulating sensor of the autonomous vehicle 100 based on the resolved segmentation scene such that the articulating sensor tracks the first object 602, the second object 604, and/or the third object 606.

While the aforementioned process has been described as utilizing a single prior segmentation scene (i.e., the first segmentation scene) and a current segmentation scene (i.e., the second segmentation scene) to generate the resolved segmentation scene, it is to be understood that the autonomous vehicle 100 may utilize more than one prior segmentation scene to generate the resolved segmentation scene. For instance, the autonomous vehicle 100 may utilize 2-10 prior segmentation scenes to generate the resolved segmentation scene.

It is understood that different segmentation approaches may result in different segmentation scenes for the same lidar data. For instance, a first segmentation approach may generate a first segmentation scene based on lidar data indicating that a single object is in the driving environment of the autonomous vehicle 100, whereas a second segmentation approach may generate a second segmentation scene based on the (same) lidar data indicating that a first object and a second object are in the driving environment. As such, the autonomous vehicle 100 utilizes the lidar conflict resolver 212 to resolve discrepancies between segmentation scenes generated by different segmentation approaches.

In operation, the lidar segmentation system 202 (by way of the segmentation component 210) generates a plurality of segmentation scenes based on a plurality of (different) segmentation approaches. Each segmentation approach in the plurality of segmentation approaches utilizes lidar data. Each segmentation scene in the plurality of segmentation scenes comprises a plurality of regions. Each region in the plurality of regions may be indicative of an object in the driving environment of the autonomous vehicle 100.

The lidar conflict resolver 212 then generates scores for each segmentation scene in the plurality of segmentation scenes based upon a scoring function. The scoring function outputs the scores based upon characteristics of the plurality of regions for each segmentation scene. More specifically, in an embodiment, each region in the regions for a segmentation scene may be a rectangular box. The characteristics may include a length of each box, a width of each box, a size of gaps between each box, and a number of boxes in the segmentation scene. Different boxes may be assigned positive or negative sub-scores (described below) based upon their respective characteristics. For instance, if a region has a geometry that is identified as unlikely to correspond to an object (i.e., a relatively small or large region), the lidar conflict resolver 212 may assign the region a negative sub-score. If a region has a geometry that is likely to correspond to an object, the lidar conflict resolver 212 may assign the region a positive sub-score.

In an embodiment, the lidar conflict resolver 212 may generate a score for a segmentation scene by summing sub-scores for each box. Moreover, in an embodiment, segmentation scenes generated by certain segmentation approaches may be assigned weights, and the score for the certain segmentation approaches may be further based upon the weights.

The lidar conflict resolver 212 then selects a segmentation scene from amongst the plurality of segmentation scenes based upon the scores. For instance, the lidar conflict resolver 212 may select the segmentation scene having the greatest score amongst the scores. The autonomous vehicle 100 then controls (by way of the control system 122) at least one of the engine 108, the braking system 110, or the steering system 112 during operation of the autonomous vehicle 100 in the driving environment.

In an embodiment, the lidar conflict resolver 212 may remove self-contradictory segmentation scenes from the plurality of segmentation scenes prior to selecting the segmentation scene. For instance, a self-contradictory segmentation scene may include more than one rectangular box over a given set of points, indicating that the segmentation scene indicates that the (same) set of points belongs to two distinct objects. The lidar conflict resolver 212 may identify this segmentation scene as self-contradictory and may remove it from consideration for selection.

Figure 7:
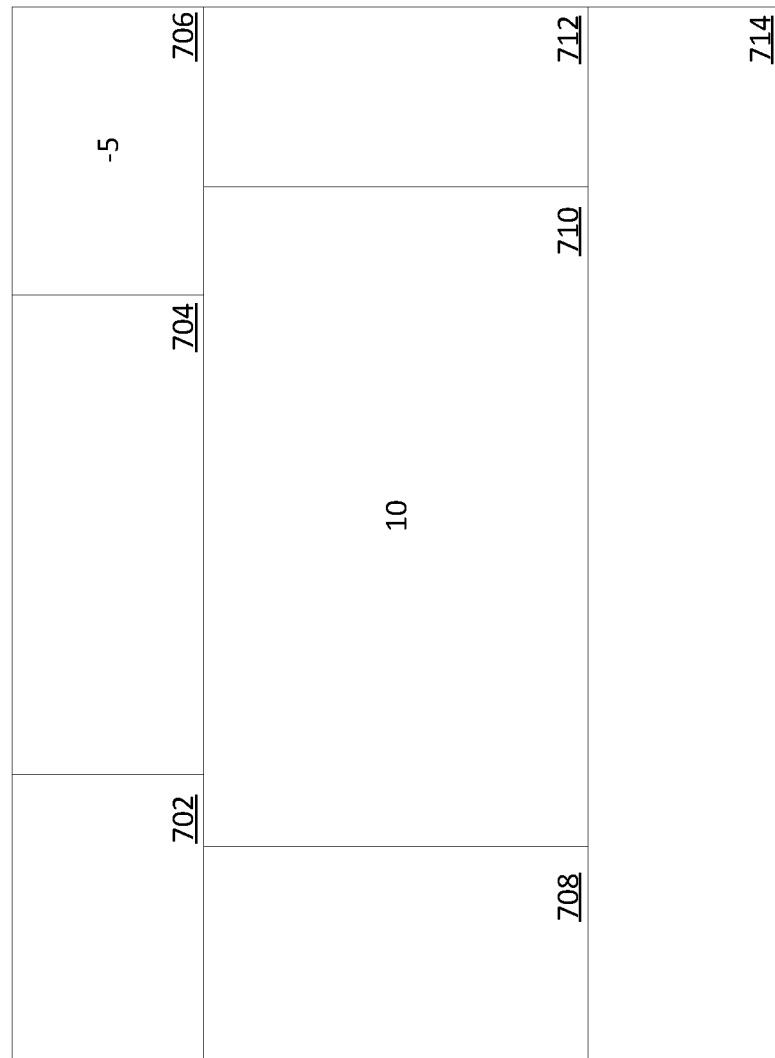
FIG. 7 is a depiction of scoring of regions of a first segmentation scene for a point cloud.

FIG. 7 illustrates a segmentation scene 700 that is generated by the segmentation component 210 based upon lidar data. The segmentation scene 700 is scored by the lidar conflict resolver 212. The segmentation scene 700 includes a plurality of regions 702-714. In the first scored segmentation scene, the region 710 is assigned a positive sub-score (10) and the region 706 is assigned a negative sub-score (−5), indicating that the region 706 is less likely to correspond to a single object. In an example, the region 710 may correspond to a single object in a driving environment of the autonomous vehicle 100. Regions devoid of objects are not assigned scores (e.g., the region 702, the region 704, etc.)

Figure 8:
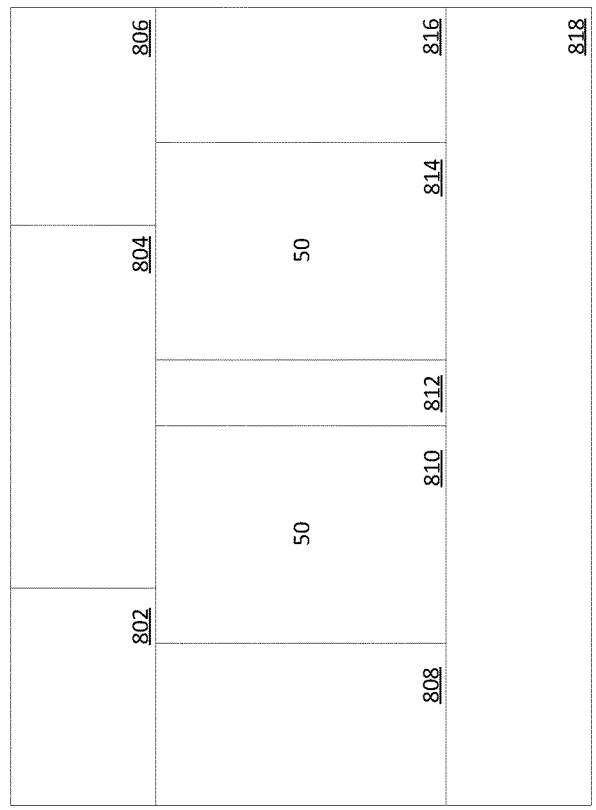
FIG. 8 is a depiction of scoring of regions of a second segmentation scene for the point cloud in FIG. 7.

FIG. 8 illustrates a segmentation scene 800 that is generated by the segmentation component 210 based upon the (same) lidar data used to generate the segmentation scene 700 shown in FIG. 7. The segmentation scene 800 is scored by the lidar conflict resolver 212. The segmentation scene 800 is generated using a different segmentation approach than the approach used to generate the segmentation scene 700. The segmentation scene 800 includes a plurality of regions 802-818. Notably, the segmentation scene 800 includes a region 810, an empty region 812, and a region 814 in an area corresponding to the region 710 in the segmentation scene 700. In the segmentation scene 800, the region 810 and the region 814 are each assigned a (positive) sub-score of 50, indicating that the region 810 and the region 814 are more likely to correspond to separate objects in the driving environment. In an example, the region 810 may correspond to a first object in the driving environment of the autonomous vehicle 100 and the region 814 may correspond to a second object in the driving environment of the autonomous vehicle 100.

Figure 9:
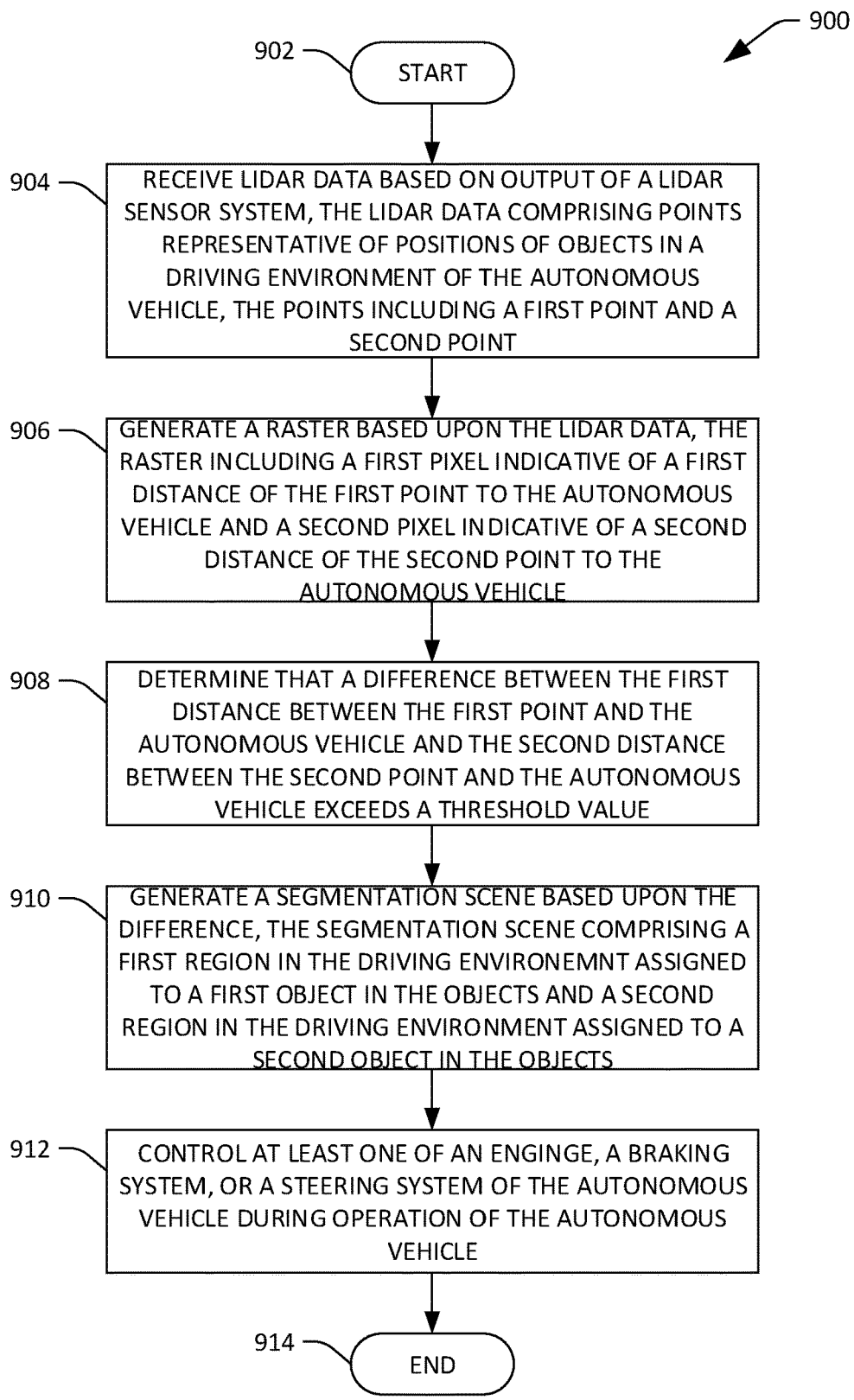
FIG. 9 is a flow diagram illustrating an exemplary methodology for generating a segmentation scene using a raster.
Figure 10:
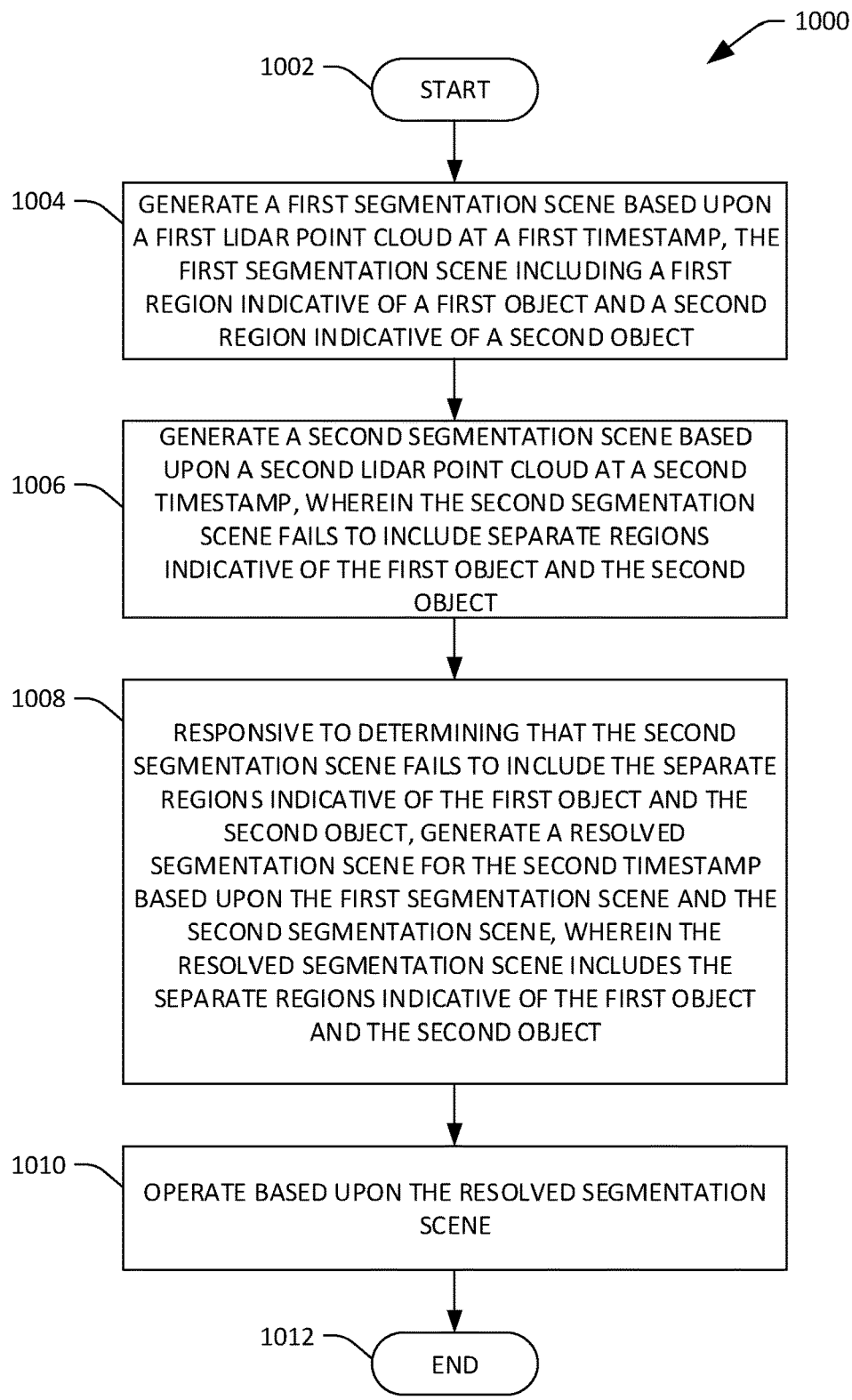
FIG. 10 is a flow diagram illustrating an exemplary methodology for generating a current segmentation scene based in part upon a prior segmentation scene.
Figure 11:
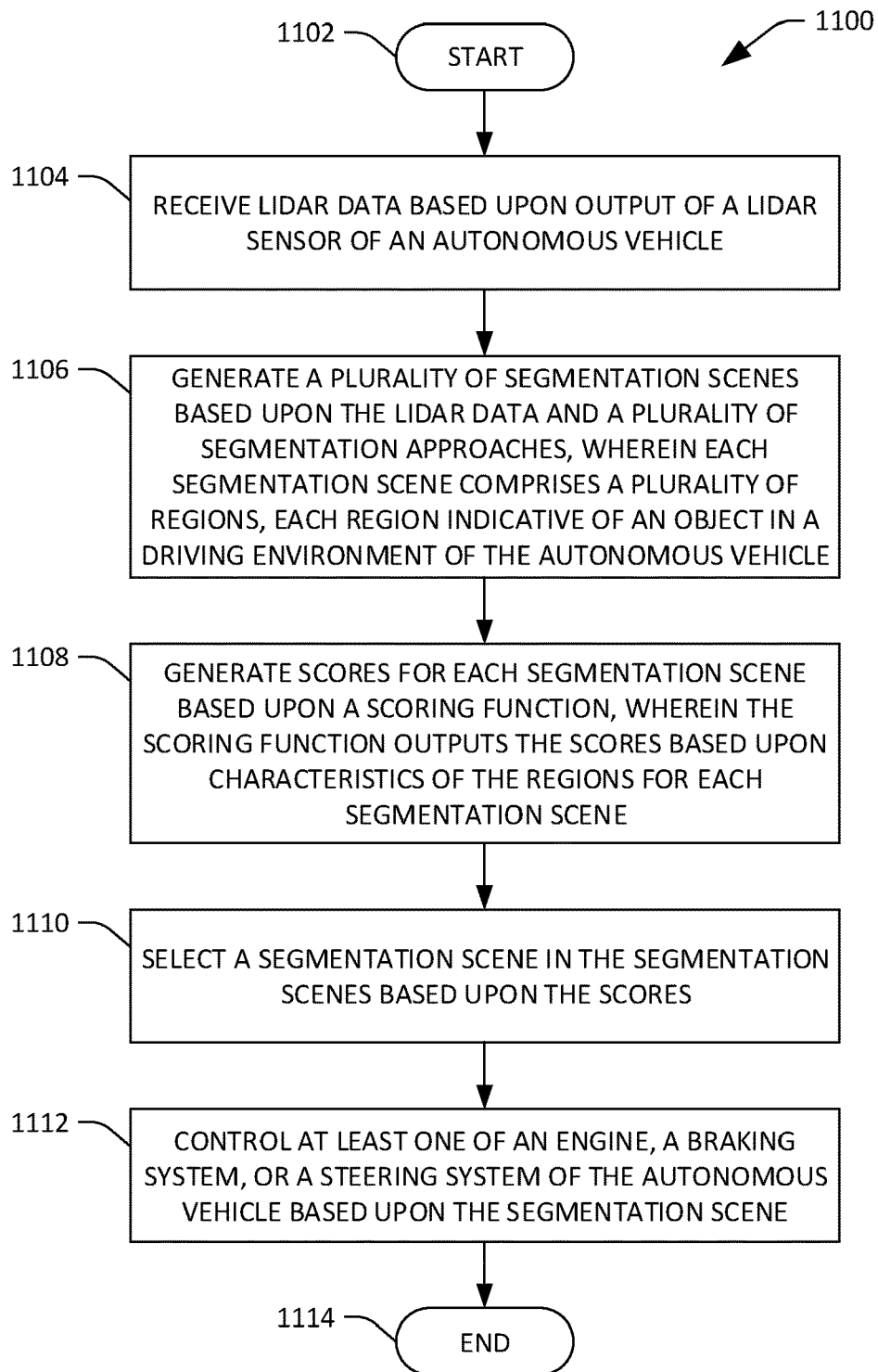
FIG. 11 is a flow diagram illustrating an exemplary methodology for resolving conflicts between segmentation scenes.

FIGS. 9-11 illustrate exemplary methodologies relating to navigating an autonomous vehicle using segmentation scenes. While the methodologies are shown and described as being a series of acts that are executed in a sequence, it is to be understood and appreciated that the methodologies are not limited by the ordering of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 9, an exemplary methodology 900 executed by an autonomous vehicle for generating a segmentation scene using a raster is illustrated. The methodology 900 begins at 902, and at 904 the autonomous vehicle receives lidar data based on output of a lidar sensor system of the autonomous vehicle. The lidar data comprises points representative of positions of objects in a driving environment of the autonomous vehicle. The points include a first point and a second point. At 906, the autonomous vehicle generates a raster based upon the lidar data. The raster includes a first pixel indicative of a first distance of the first point to the autonomous vehicle and a second pixel indicative of a second distance of the second point to the autonomous vehicle.

At 908, the autonomous vehicle determines that a difference between the first distance between the first point and the autonomous vehicle and the second distance between the second point and the autonomous vehicle exceeds a threshold value. At 910, the autonomous vehicle generates a segmentation scene based upon the difference. The segmentation scene comprises a first region in the driving environment assigned to a first object in the objects and a second region in the driving environment assigned to a second object in the objects. The first region includes the first point and the second region includes the second point. At 912, the autonomous vehicle controls at least one of an engine of the autonomous vehicle, a braking system of the autonomous vehicle, or a steering system of the autonomous vehicle during operation of the autonomous vehicle in the driving environment based upon the segmentation scene. The methodology 900 concludes at 914.

Turning now to FIG. 10, an exemplary methodology 1000 executed by an autonomous vehicle for generating a current segmentation scene based in part upon a prior segmentation scene is illustrated. The methodology 1000 begins at 1002, and at 1004 the autonomous vehicle generates a first segmentation scene based upon a first lidar point cloud from a lidar sensor system mounted on the autonomous vehicle. The first segmentation scene comprises a first region including a first point and a second region including a second point, wherein the first region is indicative of a first object in a driving environment of the autonomous vehicle at a first timestamp, wherein the second region is indicative of a second object in the driving environment at the first timestamp.

At 1006, responsive to receiving a second lidar point cloud from the lidar sensor system, the autonomous vehicle generates a second segmentation scene based upon a second lidar point cloud from the lidar sensor system at a second timestamp occurring after the first timestamp. The second segmentation scene fails to include separate regions indicative of the first object and the second object. At 1008, responsive to determining that the second segmentation scene fails to include the regions indicative of the first object and the second object, the autonomous vehicle generates a resolved segmentation scene for the second timestamp based upon the first segmentation scene and the second segmentation scene, wherein the resolved segmentation scene includes the regions indicative of the first object and the second object. At 1010, the autonomous vehicle operates based upon the resolved segmentation scene. The methodology 1000 concludes at 1012.

With reference now to FIG. 11, an exemplary methodology 1100 executed by an autonomous vehicle for resolving conflicts between segmentation scenes is illustrated. The methodology 1100 begins at 1102, and at 1104, the autonomous vehicle receives lidar data based upon output of a lidar sensor of the autonomous vehicle. The lidar data comprises points representative of positions of objects in a driving environment of the autonomous vehicle. At 1106, responsive to receiving the lidar data, the autonomous vehicle generates a plurality of segmentation scenes based upon the lidar data and a plurality of segmentation approaches. Each segmentation scene in the plurality of segmentation scenes comprises a plurality of regions, wherein each region is indicative of an object in the driving environment of the autonomous vehicle.

At 1108, the autonomous vehicle generates scores for each segmentation scene in the plurality of segmentation scenes based on a scoring function. The scoring function outputs the scores based upon characteristics of the regions for each segmentation scene. At 1110, the autonomous vehicle selects a segmentation scene in the plurality of segmentation scenes based upon the scores. At 1112, the autonomous vehicle controls at least one of an engine, a braking system, or a steering system of the autonomous vehicle based upon the segmentation scene. The methodology 1100 concludes at 1114.

Figure 12:
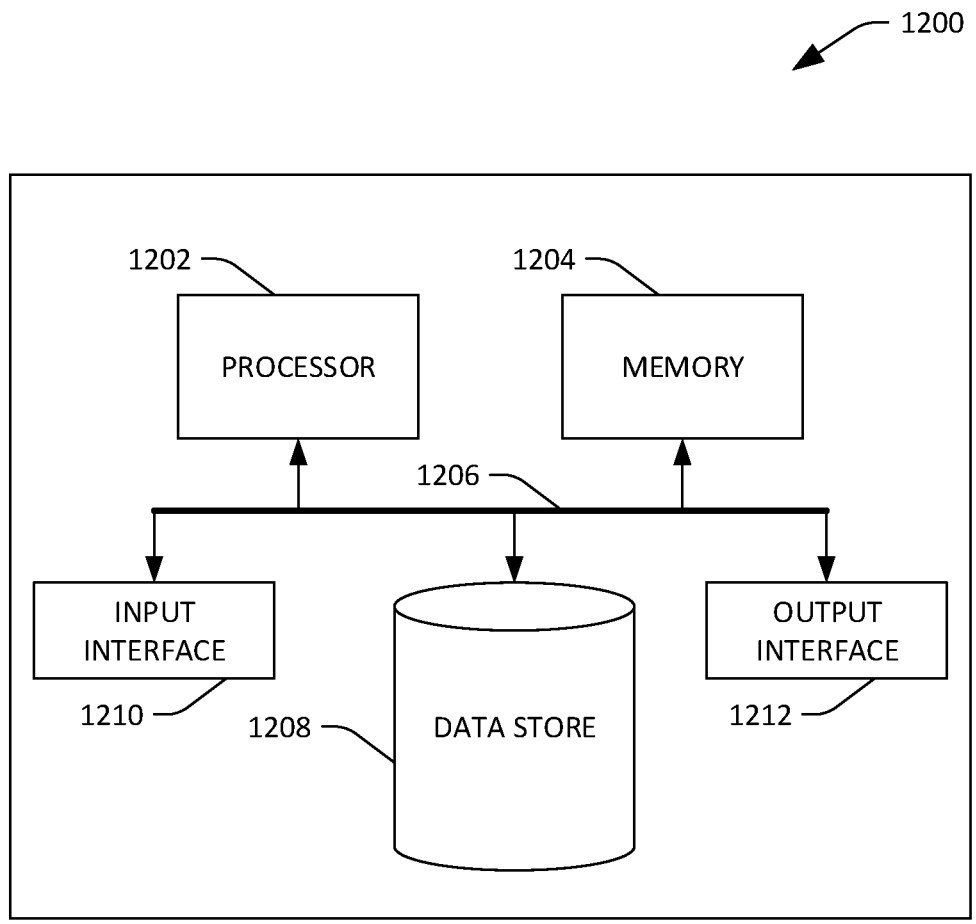
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be or include the computing system 114. The computing device 1200 includes at least one processor 1202 that executes instructions that are stored in a memory 1204. The instructions may be, for instance, instructions for implementing functionality described as being carried out by one or more modules and systems discussed above or instructions for implementing one or more of the methods described above. The processor 1202 may be a GPU, a plurality of GPUs, a CPU, a plurality of CPUs, a multi-core processor, etc. The processor 1202 may access the memory 1204 by way of a system bus 1206. In addition to storing executable instructions, the memory 1204 may also store lidar data, lidar point clouds, rasters, segmentation scenes, segmentation approaches, etc.

The computing device 1200 additionally includes a data store 1208 that is accessible by the processor 1202 by way of the system bus 1206. The data store 1208 may include lidar data, lidar point clouds, rasters, segmentation scenes, segmentation approaches, etc. The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the engine 108, the braking system 110, and/or the steering system 112 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
   an engine;
   a braking system;
   a steering system;
   a light detection and ranging (lidar) sensor; and
   a computing system that is in communication with the engine, the braking system, the steering system, and the lidar sensor, wherein the computing system comprises:
      a processor; and
      memory that stores instructions that, when executed by the processor, cause the processor to perform acts comprising:
         receiving lidar data, the lidar data based upon output of the lidar sensor, the lidar data comprising points representative of positions of objects in a driving environment of the autonomous vehicle;
         responsive to receiving the lidar data, generating a plurality of segmentation scenes using a different respective segmentation algorithm to generate each of the segmentation scenes in the plurality of segmentation scenes, each segmentation algorithm in the plurality of segmentation algorithms utilizing the lidar data, wherein each segmentation scene in the plurality of segmentation scenes is representative of a same portion of the driving environment, and wherein each segmentation scene comprises a plurality of regions, wherein each region in the plurality of regions for each segmentation scene in the plurality of segmentation scenes is indicative of an object in the objects;
         generating a score for each segmentation scene in the plurality of segmentation scenes based upon a scoring function, wherein the scoring function outputs the scores based upon geometric features of the plurality of regions for each segmentation scene in the plurality of segmentation scenes, wherein a first score for a first segmentation scene that comprises a first plurality of regions is generated based upon assigning a sub-score to each region in the first plurality of regions based upon geometric features of the first plurality of regions, wherein each of the first plurality of regions is representative of a different object;
         selecting a segmentation scene in the plurality of segmentation scenes based upon the scores; and
         controlling at least one of the engine, the braking system, or the steering system during operation of the autonomous vehicle in the driving environment based upon the selected segmentation scene.

2. The autonomous vehicle of claim 1, wherein the autonomous vehicle further comprises an articulating sensor, the acts further comprising:
   controlling the articulating sensor based upon the selected segmentation scene.

3. The autonomous vehicle of claim 2, wherein controlling the articulating sensor comprises causing the articulating sensor to remain directed towards an object in the driving environment as the autonomous vehicle moves about the driving environment.

4. The autonomous vehicle of claim 1, wherein the geometric features of the first plurality of regions comprise:
   a length of each region;
   a width of each region;
   a size of a gap between each region; and
   a number of regions in each segmentation scene.

5. The autonomous vehicle of claim 1, wherein the lidar data is a lidar point cloud.

6. The autonomous vehicle of claim 1, wherein each region in the plurality of regions for each segmentation scene in the plurality of segmentation scenes is a rectangular box, wherein the selected segmentation scene in the plurality of segmentation scenes comprises a first rectangular box and a second rectangular box, wherein the first rectangular box is assigned a positive sub-score, wherein the second rectangular box is assigned a negative sub-score.

7. The autonomous vehicle of claim 1, wherein generating the first score for the first segmentation scene in the segmentation scenes comprises:
   summing the sub-score of each region in the first plurality of regions to yield the first score.

8. The autonomous vehicle of claim 1, the acts further comprising:
   subsequent to receiving the lidar data, assigning labels to each region in the plurality of regions of a segmentation scene in the segmentation scenes, wherein each label is indicative of a type of object in the objects.

9. The autonomous vehicle of claim 8, wherein the type of object is one of:
   a car;
   a truck;
   a motorcycle;
   a bicycle;
   a bus;
   a static object; or
   a pedestrian.

10. A method of controlling operation of an autonomous vehicle, the method executed by a computing device included on the autonomous vehicle, the method comprising:
    receiving light detection and ranging (lidar) data from a lidar sensor mounted on the autonomous vehicle, the lidar data comprising a plurality of points representative of positions of objects in a driving environment of the autonomous vehicle;
    responsive to receiving the lidar data, generating a plurality of segmentation scenes using a different respective segmentation algorithm to generate each of the segmentation scenes in the plurality of segmentation scenes, each of the segmentation algorithms in the plurality of segmentation algorithms utilizing the lidar data, wherein each segmentation scene in the plurality of segmentation scenes is representative of a same portion of the driving environment, and wherein each segmentation scene in the plurality of segmentation scenes comprises a plurality of regions, wherein each region in the plurality of regions for each segmentation scene in the plurality of segmentation scenes is indicative of an object in the objects, each region in a same segmentation scene being representative of a different object;

generating a score for each segmentation scene in the plurality of segmentation scenes based upon a scoring function, wherein the scoring function outputs a first score for a first segmentation scene that comprises a first plurality of regions based upon assigning a sub-score to each region in the first plurality of regions based upon geometric features of the first plurality of regions;

selecting a segmentation scene in the plurality of segmentation scenes based upon the scores; and controlling operation of the autonomous vehicle in the driving environment based upon the selected segmentation scene.

11. The method of claim 10, wherein the autonomous vehicle further comprises an articulating sensor, the method further comprising:

controlling the articulating sensor based upon the selected segmentation scene.

12. The method of claim 11, wherein controlling the articulating sensor comprises causing the articulating sensor to remain directed towards an object in the driving environment of the autonomous vehicle as the autonomous vehicle moves about the driving environment.

13. The method of claim 10, wherein the geometric features of the first plurality of regions comprise:
  a length of each region;
  a width of each region;
  a size of a gap between each region; and
  a number of regions in each segmentation scene.

14. The method of claim 10, wherein a segmentation algorithm in the plurality of segmentation algorithms utilizes a raster generated from the lidar data in order to generate its corresponding segmentation scene.

15. The method of claim 10, wherein each region in the plurality of regions for each segmentation scene in the plurality of segmentation scenes is a rectangular box, wherein the selected segmentation scene in the plurality of segmentation scenes comprises a first rectangular box that is representative of a first object and a second rectangular box that is representative of a second object, wherein the first rectangular box is assigned a positive sub-score, wherein the second rectangular box is assigned a negative sub-score.

16. The method of claim 10, wherein generating the first score for the first segmentation scene in the segmentation scenes comprises:

summing the sub-score of each of the first plurality of regions to yield the first score.

17. The method of claim 10, the method further comprising:

subsequent to receiving the lidar data, assigning a label to a first region in the plurality of regions of a first segmentation scene in the segmentation scenes, wherein the label is indicative of a type of object in the objects.

18. The method of claim 17, wherein the type of object is one of:
  a car;
  a truck;
  a motorcycle;
  a bicycle;
  a bus;
  a static object; or
  a pedestrian.

19. The method of claim 10, wherein a segmentation algorithm for the selected segmentation scene is assigned a weight, wherein the score for the segmentation scene is further based upon the weight.

20. An autonomous vehicle comprising:

a non-transitory computer-readable storage medium comprising instructions that, when executed by a processor of the autonomous vehicle, cause the processor to perform acts comprising:

receiving a light detection and ranging (lidar) point cloud from a lidar sensor system mounted on the autonomous vehicle, the lidar point cloud comprising a plurality of points representative of positions of objects in a driving environment of the autonomous vehicle;

responsive to receiving the lidar point cloud, generating a plurality of segmentation scenes using a different respective segmentation algorithm to generate each of the segmentation scenes in the plurality of segmentation scenes, each of the segmentation algorithms configured to generate a segmentation scene based upon the lidar point cloud, wherein each segmentation scene in the plurality of segmentation scenes comprises a plurality of regions, wherein each region in the plurality of regions for each segmentation scene in the plurality of segmentation scenes is indicative of an object in the objects, each region in a same segmentation scene being representative of a different object;

generating a score for each segmentation scene in the plurality of segmentation scenes based upon a scoring function, wherein the scoring function outputs a first score for a first segmentation scene that comprises a first plurality of regions based upon assigning a sub-score to each region in the first plurality of regions based upon geometric characteristics of the first plurality of regions;

selecting a segmentation scene in the plurality of segmentation scenes based upon the scores; and controlling at least one of an engine of the autonomous vehicle, a braking system of the autonomous vehicle, or a steering system of the autonomous vehicle during operation of the autonomous vehicle in the driving environment based upon the selected segmentation scene.

* * * * *